United States Patent
Duggan et al.

(12)

(10) Patent No.: US 6,522,548 B1
(45) Date of Patent: Feb. 18, 2003

(54) FACETED EXTENDED INTERFACE MODULE

(75) Inventors: Michael Patrick Duggan, Snellville, GA (US); Andrew F. McCann, Lawrenceville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 49 days.

(21) Appl. No.: 09/916,550

(22) Filed: Jul. 27, 2001

(51) Int. Cl.[7] .............................. H05K 7/00; H05K 7/10
(52) U.S. Cl. ..................... 361/728; 361/730; 361/797; 439/535; 174/59
(58) Field of Search ............................. 361/728–730, 361/796, 797, 823; 439/63, 326, 535, 578; 174/59

(56) References Cited

U.S. PATENT DOCUMENTS 3,892,911 A  *  7/1975  Codrino ..................... 174/59
5,216,203 A  *  6/1993  Gower ....................... 174/65 R
5,781,844 A  *  7/1998  Spriester et al. ............ 725/149

* cited by examiner

Primary Examiner—Jayprakash N. Gandhi
(74) Attorney, Agent, or Firm—Kenneth M. Massaroni; Hubert J. Barnhardt, III; Shelley L. Couturier

(57) ABSTRACT

An interface module included in a headend rack for enclosing electronic circuitry having a top, a bottom, and a back side that slides into the headend rack and connects to a backplane. The interface module includes a first planar surface connecting to the top side forming a first angle, a second planar surface connecting to the bottom side forming a second angle, and a front planar surface connecting the first and second planar surfaces. The first and second angles are equal and are obtuse. The interface module further includes a plurality of connectors extending from the first, second, and front planar surfaces for electrically coupling mating connectors with the enclosed electronic circuitry. The first, second, and front planar sides extend out of the headend rack, whereby the first, second, and front planar extended surfaces allow for a greater area for the plurality of connectors, thereby allowing conventional modules to be combined into one interface module.

8 Claims, 4 Drawing Sheets

FACETED EXTENDED INTERFACE MODULE

RELATED APPLICATIONS

This application is related to commonly entitled "Extended Interface Module" filed on Jun. 12, 2001, U.S. Ser. No. 29/143,331.

FIELD OF THE INVENTION

This invention relates generally to broadband communications systems, such as cable television systems, and more specifically to an extended interface module used in headend racks that is suitable for use in the broadband communications systems.

BACKGROUND OF THE INVENTION

A broadband communications system 100, such as a two-way hybrid/fiber coaxial (HFC) communications system, is depicted in FIG. 1. Such a system may be used in, for example, a cable television network; a voice delivery network, such as a telephone system; and a data delivery network to name but a few. The communications system 100 includes headend equipment 105 for generating forward signals (e.g., voice, video, or data signals) that are transmitted in the forward, or downstream, direction along a first communication medium, such as a fiber optic cable 110. Coupled to the headend 105 are optical nodes 115 that convert the optical signals to radio frequency (RF) signals. The RF signals are further transmitted along a second communication medium, such as coaxial cable 120, and are amplified, as necessary, by one or more distribution amplifiers 125 positioned along the communication medium. Taps 130 included in the communications system split off portions of the forward signals for provision to subscriber equipment 135, such as set-top terminals, computers, telephone handsets, modems, and televisions. It will be appreciated that only one fiber link connecting the headend 105 with a node 115 is shown for simplicity; however, there are typically several different fiber links connecting the headend 105 with several additional nodes 115, amplifiers 125, and subscriber equipment 135.

In a two-way system, the subscriber equipment 135 can also generate reverse electrical signals that are transmitted upstream to the headend equipment 105. Such reverse signals may be amplified by any one or more of the distribution amplifiers 125 and converted to optical signals by the optical node 115 before being provided to the headend equipment 105.

In a typical headend facility, the necessary equipment for signal processing comprises a significant number of modulators, demodulators, upconverters, and power supplies to name but a few. By way of example, a communications system may deliver 132 stereo channels of broadband video and audio to subscriber equipment that originates from the headend facility. The required headend equipment for 132 stereo channels may be, for example, housed in 8 racks each with 32 chassis for a total of 256 chassis. FIG. 2 illustrates one such rack 205 having 32 chassis. Spaces 210 are left in between the equipment rows for air circulation and extensive cabling is routed in the back of the racks A (not shown). The additional 7 racks (not shown) are situated tightly against the illustrated rack 205.

Due to all the required racks for the headend equipment, the headend facility is typically limited in physical space. This space constraint may pose costly problems for the operator. More specifically, operators may be upgrading existing services and adding more channels to the current channel lineup. As a result, more equipment will be required in the headend facility. Consequently, some operators may have to move their headend equipment to a larger facility to accommodate the newly required equipment. What is needed, therefore, are modules that allow the operator to design a more efficient layout of the headend facility using existing racks rather than the conventional layout using the conventional headend equipment.

BRIEF DESCRIPTION OF THE DRAWINGS

FIG. 2 illustrates one headend rack that is suitable for use in the headend facility of the communications system of FIG. 1.

DETAILED DESCRIPTION OF A PREFERRED EMBODIMENT

The present invention will be described more fully hereinafter with reference to the accompanying drawings in which like numerals represent like elements throughout the several figures, and in which an exemplary embodiment of the invention is shown. This invention may, however, be embodied in different forms and should not be construed as limited to the embodiment set forth herein; rather, the embodiment is provided so that this disclosure will be thorough and complete, and will fully convey the scope of the invention to those skilled in the art. For example, the embodiment set forth herein refers to a faceted extended interface module. The module includes a plurality of connectors that are partially exposed on the outside of a housing enclosure of the extended interface module. The present invention can be modified to accommodate varying connectors arranged in different arrangements. Advantageously, the preferred embodiment of the extended interface module is used within the conventional racks that may already be installed in a headend facility that allows an operator a more efficient module to design into a new headend facility or into an existing headend facility for upgrades. The present invention is described more fully hereinbelow.

Figure 1:
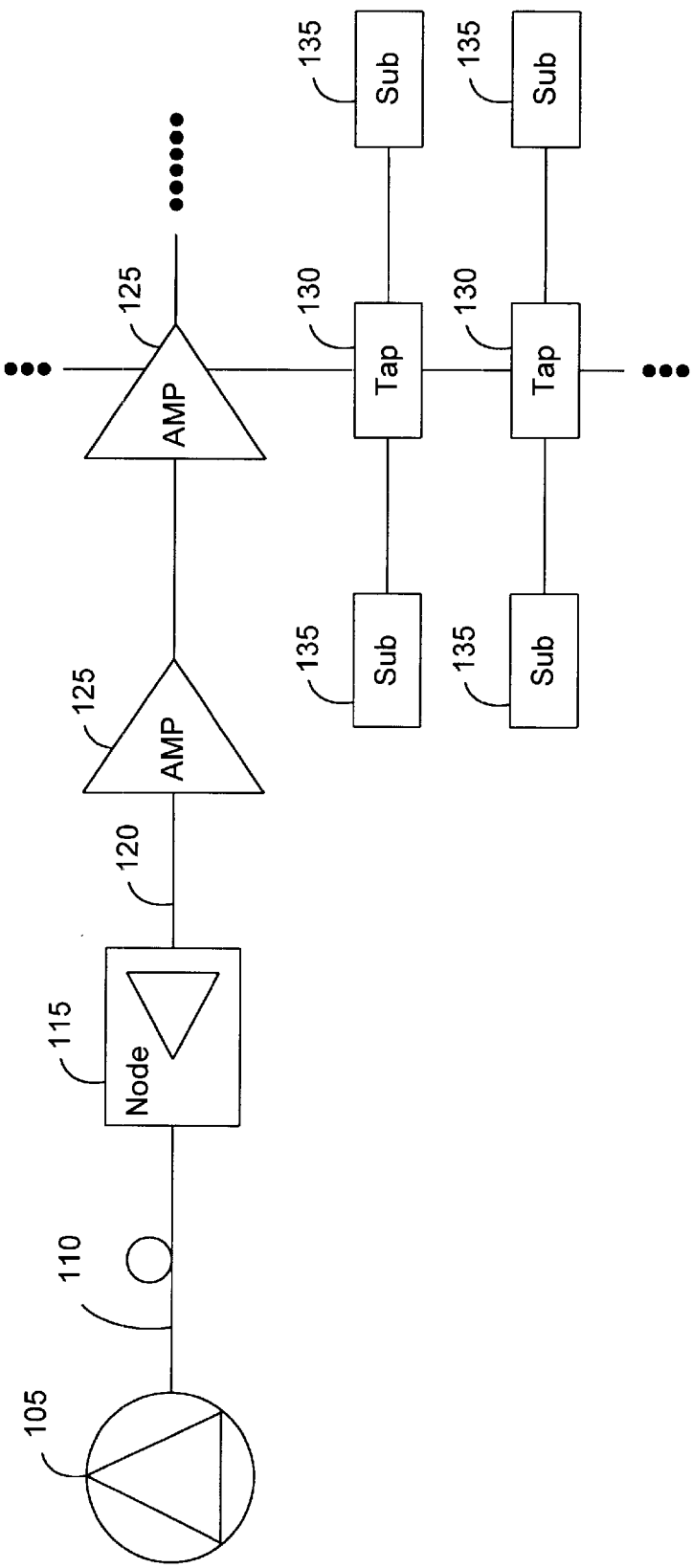
FIG. 1 is a block diagram of a conventional broadband communications system that carries analog optical and electrical signals.
Figure 2:
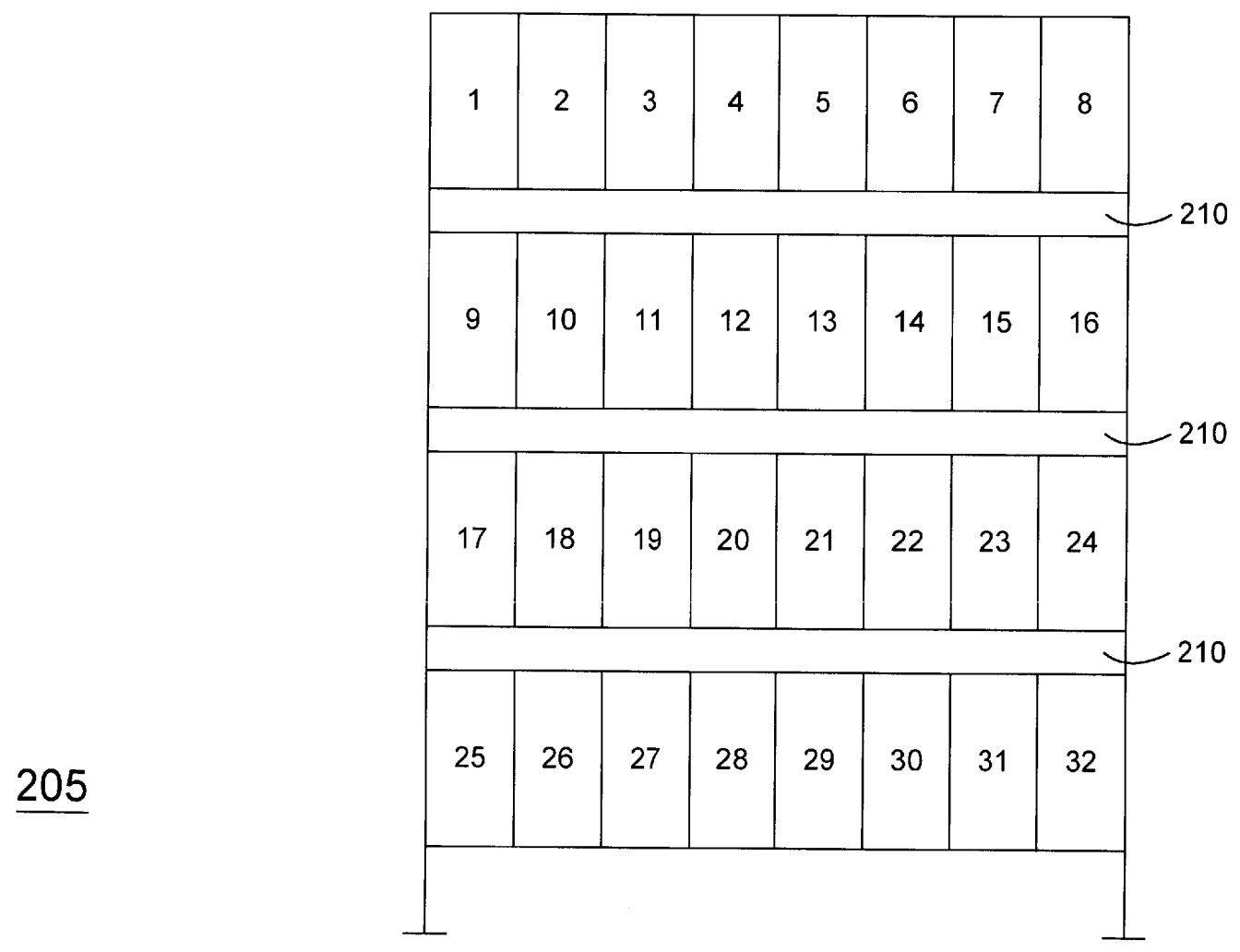
Figure 3:
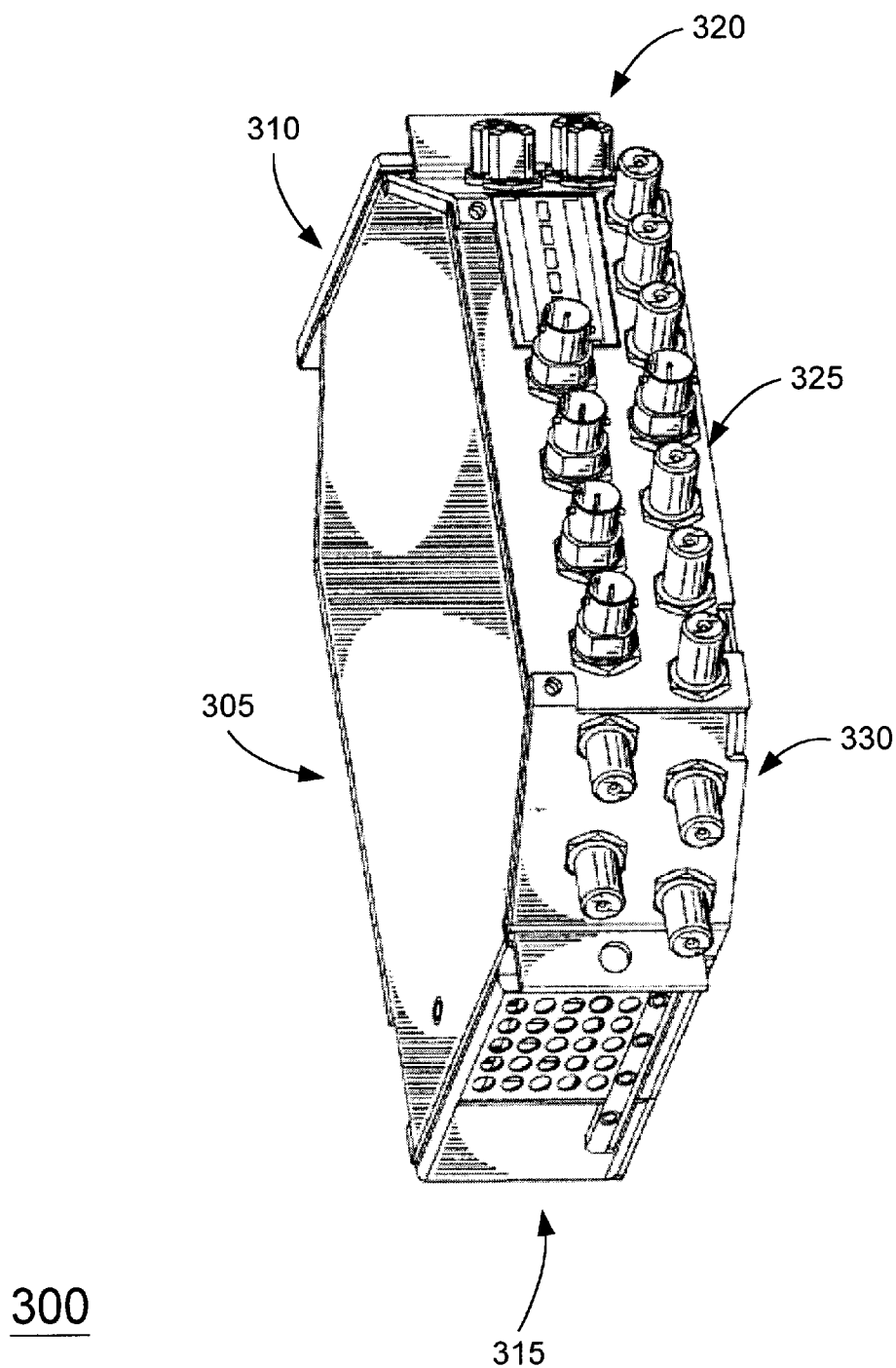
FIG. 3 illustrates a faceted extended interface module in accordance with the present invention that is suitable for use in the headend rack of FIG. 2.

FIG. 3 illustrates a faceted extended interface module 300 in accordance with the present invention that is suitable for use in a headend rack, such as shown in FIG. 2. As previously mentioned, the interface module 300 slides into conventional headend racks; therefore, the back 305, top 310, and bottom 315 planar sides of the module 300 are essentially the same dimensions as the conventional headend equipment in order to fit into standard headend racks. The front faceted planar sides 320, 325, 330 of the module 300 in accordance with the present invention extend out of the rack. Advantageously, the extended sides allow additional space for installing a plurality of connectors. In contrast, the conventional headend equipment's front face does not extend out of the rack and, because it's not faceted, but rather has a flat front face, it possesses a much smaller area for connectors. As a result, a main advantage of the present invention is more area on the front of the housing to accommodate a substantially greater number of connectors.

In this manner, additional functionality can be designed in the electronic circuitry enclosed in the interface module 300. Additionally or alternatively, conventional headend modules can be combined into one interface module 300. More specifically, an interface module 300 can combine, for example, a stereo module and a modulator module in one interface module 300. Advantageously, combining conventional modules into one interface module 300 drastically cuts down on the required spaces within the rack allowing more room in the headend facility. For example, an operator can now broadcast 132 stereo channels of broadband video and audio using the interface module 300. A conventional stereo module and upconverter can be combined into one interface module 300. Significantly, 4 racks are needed for the equipment when using the extended interface module 300, compared to the 8 racks previously needed. In this manner, 4 extra racks can either be removed or reallocated to include additional equipment to upgrade the channels or offer additional services to the subscribers. Additionally, the combined interface module 300 in accordance with the present invention provides an operator only one version, whereas previously the conventional stereo module and modulator module required the operator to rack several different versions to deliver 132 stereo channels.

As illustrated in FIG. 3, a combination of 24 data inputs and 19 coaxial connectors can be configured on the interface module 300. In contrast with the conventional module that includes just one distinct module, 10 coaxial connectors and 8 data inputs are typically configured on the face of the module. It will be appreciated that the type of connector and placement as shown in FIG. 3 can be changed depending on the design and intended functionality of the internal circuitry.

Figures 4, 5:
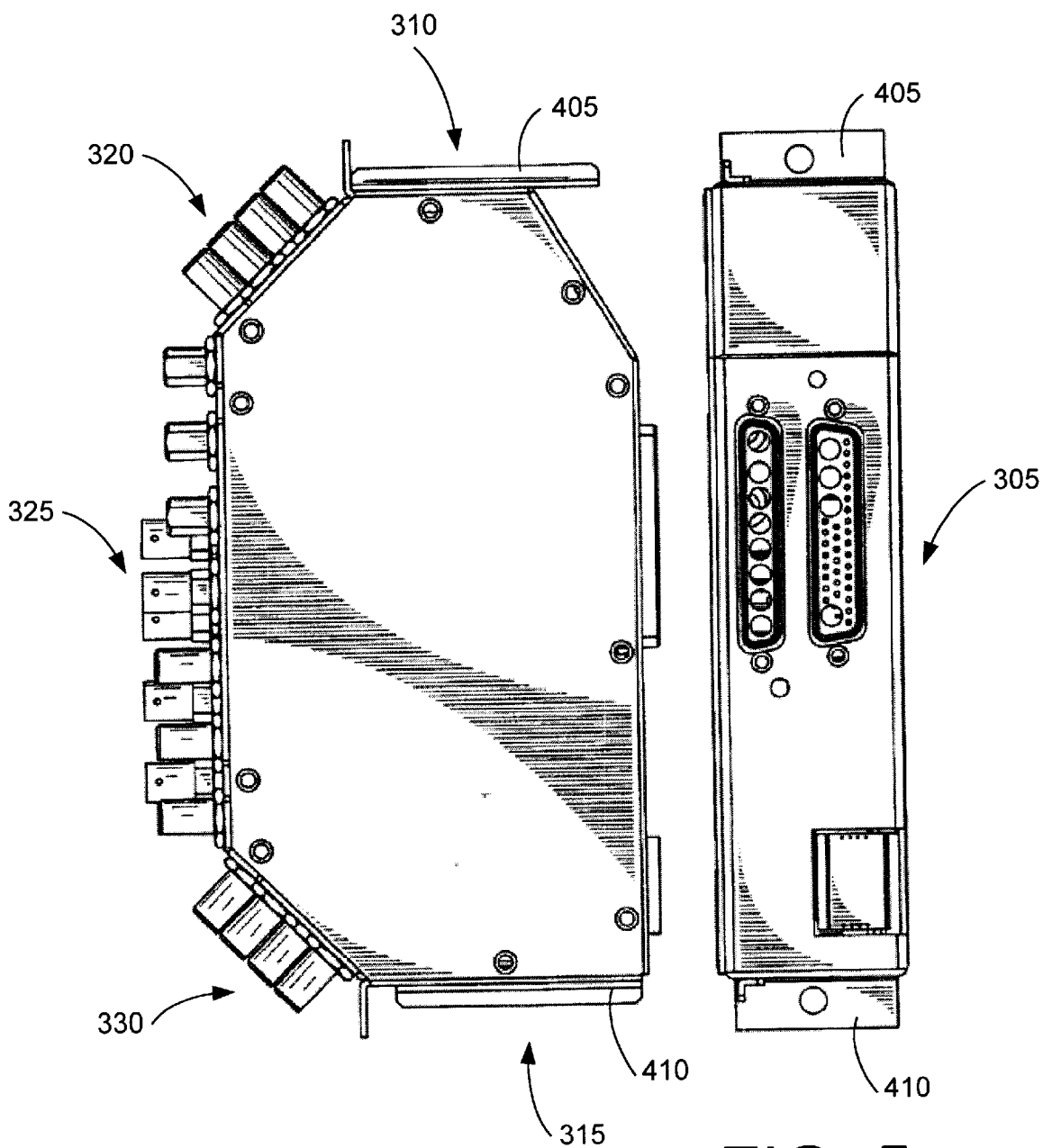
FIG. 4 illustrates a side view of the interface module of FIG. 3 in accordance with the present invention.
FIG. 5 illustrates an example of the back side of the interface module of FIG. 3 in accordance with the present invention.

FIG. 4 illustrates a side view of the interface module in accordance with the present invention. The faceted sides 320, 325, 330 of the module 300 are connected at 135-degree angles; however, these angles and the lengths of the faceted sides 320, 325, 330 can be changed to other dimensions. Metal guides and stops 405, 410 located on the top 310 and bottom 315 sides guide the module 300 into the rack and allow the module 300 to be bolted into the headend rack. The sides 320, 325, 330 then extend outward from the rack exposing portions of the connectors thereby allowing connections with appropriate mating connectors and cabling.

FIG. 5 illustrates an example of the back side 305 of the interface module 300 in accordance with the present invention. As illustrated two different types of D-sub connectors are used to connect to a backplane (not shown) that is included in the racks. These connections route the signals to other headend equipment for transmission through the communications system.

In summary, the extended interface module 300 allows for greater flexibility in the design of a headend rack. This is accomplished by combining several conventional modules into one module while having the required space for additional connectors in accordance with the present invention.

What is claimed is:

1. An interface module included in a headend rack for enclosing electronic circuitry, the interface module having a top, a bottom, and a back side that slides into the headend rack and connects to a backplane, the interface module comprising:

a first planar surface connecting to the top side forming a first angle;

a second planar surface connecting to the bottom side forming a second angle;

a front planar surface connecting the first and second planar surfaces, wherein the first and second angles are equal, and the first and second angles are obtuse, and wherein the first, second, and front planar surfaces extend out of the headend rack; and a plurality of connectors extending from the first, second, and front planar surfaces for electrically coupling mating connectors with the enclosed electronic circuitry, whereby the first, second, and front planar extended surfaces allow for a greater area for the plurality of connectors, thereby allowing at least two modules to be combined into one interface module.

2. The interface module of claim 1, further comprising:

backplane connectors on the back side for electrically coupling the electronic circuitry with the backplane.

3. The interface module of claim 1, wherein the plurality of connectors on the extended surfaces comprises data input connectors and coaxial input connectors.

4. The interface module of claim 1, wherein the combined modules include a stereo module and a modulator module.

5. A headend facility including racks of headend equipment for transmitting and receiving information signals in a broadband communications system, the headend equipment comprising an interface module included in a headend rack, the interface module comprising:

a housing having a top, a bottom, and a back side for enclosing electronic circuitry, the housing comprising:

a first planar surface connecting to the top side forming a first angle;

a second planar surface connecting to the bottom side forming a second angle; and a front planar surface connecting the first and second planar surfaces, wherein the first and second angles are equal, and the first and second angles are obtuse, and wherein the first, second, and front planar surfaces extend outward past the headend rack; and a plurality of connectors extending from the first, second, and front planar surfaces for electrically coupling mating connectors to the enclosed electronic circuitry;

wherein the electronic circuitry combines a stereo module and a modulator module.

6. The headend facility of claim 5, wherein the interface module further comprises:

backplane connectors on the back side for electrically coupling the electronic circuitry with a backplane in the headend rack.

7. The headend facility of claim 5, wherein the plurality of connectors on the extended surfaces comprises data input connectors and coaxial input connectors.

8. A broadband communications system for transmitting and receiving information signals, the broadband communications system including a headend facility for transmitting the information signals to subscriber equipment, the headend facility including a plurality of racks for racking headend equipment, the headend equipment including a plurality of interface modules, an interface module comprising:

a housing having a top, a bottom, and a back side that slides into a headend rack, the back side including backplane connectors for connecting into a backplane, the housing for enclosing electronic circuitry, the housing comprising:
        a first planar surface connecting to the top side forming a first angle;
        a second planar surface connecting to the bottom side forming a second angle; and
        a front planar surface connecting the first and second planar surfaces,
        wherein the first and second angles are equal, and the first and second angles are obtuse, and wherein the first, second, and front planar surfaces extend outward past the headend rack,
    whereby the first, second, and front planar extended surfaces allow for a greater area for including a greater number of connectors, thereby allowing at least two modules to be combined into one interface module.

\* \* \* \* \*

UNITED STATES PATENT AND TRADEMARK OFFICE
CERTIFICATE OF CORRECTION

PATENT NO. : 6,522,548 B1  
DATED : February 18, 2003  
INVENTOR(S) : Duggan et al.

Page 1 of 1

It is certified that error appears in the above-identified patent and that said Letters Patent is hereby corrected as shown below:

Column 1,
Line 67, delete "A" between "racks" and "(not"

Signed and Sealed this

Fifth Day of August, 2003

JAMES E. ROGAN
*Director of the United States Patent and Trademark Office*